United States Patent
Goolsby (10) Patent No.: US 8,650,422 B1
(45) Date of Patent: Feb. 11, 2014

(54) TIME ADJUSTMENT FOR IMPLEMENTATION OF LOW POWER STATE

(75) Inventor: Jeremy B. Goolsby, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 271 days.

(21) Appl. No.: 13/175,725

(22) Filed: Jul. 1, 2011

(51) Int. Cl.
*G06F 1/26* (2006.01)
*G06F 1/32* (2006.01)

(52) U.S. Cl.
USPC ........... 713/322; 713/300; 713/320; 713/323; 713/324

(58) Field of Classification Search
USPC .................. 713/300, 320, 322, 323, 324
See application file for complete search history.

(56) References Cited

U.S. PATENT DOCUMENTS

| | | | | |
|---|---|---|---|---|
| 5,913,067 A | * | 6/1999 | Klein | 713/300 |
| 6,885,974 B2 | * | 4/2005 | Holle | 702/182 |
| 7,380,147 B1 | * | 5/2008 | Sun | 713/323 |
| 7,870,407 B2 | * | 1/2011 | Branover et al. | 713/323 |
| 2007/0220289 A1 | * | 9/2007 | Holle et al. | 713/300 |
| 2008/0279104 A1 | * | 11/2008 | Chen et al. | 370/235 |
| 2009/0150689 A1 | * | 6/2009 | Simeral et al. | 713/300 |
| 2009/0249096 A1 | * | 10/2009 | Conner et al. | 713/320 |
| 2011/0283128 A1 | * | 11/2011 | Farhan et al. | 713/324 |

\* cited by examiner

*Primary Examiner* — Vincent Tran
(74) *Attorney, Agent, or Firm* — Kevin T. Cuenot (57) ABSTRACT

A method of implementing a low power state within a circuit configurable to communicate at one of different communication speeds can include determining a current communication speed of the circuit and determining an inactivity duration of the circuit according to the current communication speed of the circuit. Responsive to detecting inactivity for an amount of time corresponding to the inactivity duration, the low power state can be implemented within the circuit.

14 Claims, 3 Drawing Sheets

TIME ADJUSTMENT FOR IMPLEMENTATION OF LOW POWER STATE

FIELD OF THE INVENTION

One or more embodiments disclosed within this specification relate to implementing a low power state. More particularly, one or more embodiments relate to time adjustment for implementation of a low power state within a circuit.

BACKGROUND

Integrated circuits (ICs) can be implemented to perform a variety of functions. Some ICs can be programmed to perform specified functions. One example of an IC that can be programmed is a field programmable gate array (FPGA). An FPGA typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that can include, for example, function generators, registers, arithmetic logic, and so forth.

The programmable interconnect circuitry and programmable logic circuitry are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs can also be implemented in other ways, e.g., using fuse or antifuse technology. The phrase "programmable IC" can include, but is not limited to these devices and further can encompass devices that are only partially programmable including, for example, application specific integrated circuits (ASICs). For instance, another type of programmable IC includes a combination of hard-coded transistor logic and a programmable switch fabric that programmably interconnects the hard-coded transistor logic.

Some programmable ICs can be programmed to incorporate pre-developed logic and/or circuit blocks with pre-designed functionalities, i.e., "soft cores." A soft core typically refers to a programmatic description of hardware that performs a particular function. A soft core, for example, can be specified as a hardware description language file or files, as a bitstream, or a portion thereof, that programs a programmable IC, whether fully or partially programmable, as a netlist, or the like. In other cases, a soft core can include source code or schematics that describe the logic and connectivity of a portion of a circuit design. Typical soft cores can provide, but are not limited to, DSP functions, memories, storage elements, and math functions. Some soft cores include an optimally floor-planned layout targeted to a specific family of programmable ICs. Soft cores can also be parameterizable, i.e., allowing the user to enter parameters to activate or change certain soft core functionality.

A set of configuration bits used to program programmable circuitry of a programmable IC such as an FPGA is conventionally referred to as a configuration bitstream. Programmable circuitry can include CLBs, PIPs, IOBs, or other programmably configurable circuit blocks, interconnects, or inputs/outputs. Register settings may be set via a configuration bitstream; however, hardwired registers generally are not considered to be programmable logic.

A hardwired core, or "hard core," such as an ASIC core, is not a soft core. A soft core is instantiated (e.g., implemented) in programmable logic after manufacture of an IC, whereas a hardwired core is manufactured as part of the IC. Furthermore, conventionally a hardwired core is thought of as having generally dedicated circuit blocks, interconnects, and inputs/outputs, even though a portion of a hardwired core may be set to operate responsive to register settings or other storage elements.

Many circuits, whether implemented within a programmable IC, a non-programmable IC, or specified as a soft core or a hard core, are designed to enter or implement a low power state. Typically, the circuit enters the low power state responsive to detecting some predetermined condition or set of conditions. For example, after a predetermined period of inactivity, the circuit can enter a low power state to conserve energy. In some cases, the circumstances under which the circuit enters the low power state are dictated by one or more governing standards to which the circuit must adhere. In other cases, the circuit designer has discretion to specify the particular conditions that must exist for the circuit to enter the low power state.

SUMMARY

One or more embodiments disclosed within this specification relate to implementing a low power state within a circuit and, more particularly, to time adjustment for implementation of a low power state within a circuit.

An embodiment can include a method of timing implementation of a low power state within a circuit configurable to communicate at one of a plurality of different communication speeds. The method can include determining a current communication speed of the circuit and determining an inactivity duration of the circuit according to the current communication speed of the circuit. Responsive to detecting inactivity for an amount of time corresponding to the inactivity duration, the low power state can be implemented within the circuit.

Another embodiment can include a method of timing implementation of a low power state within a circuit. The method can include selectively overriding a first timer mode according to a first parameter value. Each timer mode, for example, can specify a method of calculating an inactivity duration. Responsive to detecting inactivity for an amount of time corresponding to the inactivity duration, the low power state can be implemented. The method also can include, responsive to determining that the first parameter value does not indicate override, implementing the first timer mode. Responsive to determining that the first parameter value indicates override, a different timer mode can be implemented.

Another embodiment can include a system configurable to dynamically switch between communicating at one or more different communication speeds. The system can include a power management circuit configured to initiate a low power state within the system responsive to detecting inactivity for an amount of time corresponding to the inactivity duration. The system also can include a timer circuit configured to determine the inactivity duration according to one of a plurality of timer modes. The plurality of timer modes can include a first timer mode specifying a default value for the inactivity duration and a second timer mode selectable to override the first timer mode. The second timer mode can be operable to determine the inactivity duration according to a current communication speed of the system.

DETAILED DESCRIPTION OF THE DRAWINGS

While the specification concludes with claims defining features of one or more embodiments that are regarded as novel, it is believed that the one or more embodiments will be better understood from a consideration of the description in conjunction with the drawings. As required, one or more detailed embodiments are disclosed within this specification. It should be appreciated, however, that the one or more embodiments are merely exemplary. Therefore, specific structural and functional details disclosed within this specification are not to be interpreted as limiting, but merely as a basis for the claims and as a representative basis for teaching one skilled in the art to variously employ the one or more embodiments in virtually any appropriately detailed structure. Further, the terms and phrases used herein are not intended to be limiting, but rather to provide an understandable description of the one or more embodiments disclosed herein.

One or more embodiments disclosed within this specification relate to implementing a low power state within a circuit and, more particularly, to time adjustment for implementation of a low power state within a circuit. Numerous types of circuits implement a low power state to conserve energy. A low power state can be implemented responsive to some detected event or criteria within the circuit or external to the circuit such as a period of inactivity.

In some cases, the circuit that is to implement the low power state is capable of operating at different speeds or frequencies. When the circuit is coupled to other circuits through a communication link, it may be desirable to have greater control over the duration of inactivity on the communication link that is required prior to implementing the low power state. For example, in view of the ability of the circuit to communicate at different speeds, modifying the duration of inactivity on the communication link before implementing the low power state can be useful. Adjusting the duration of inactivity, for example, can be used to account for, counteract, offset, or respond to any changes in the communication speed of the circuit.

Figure 1:
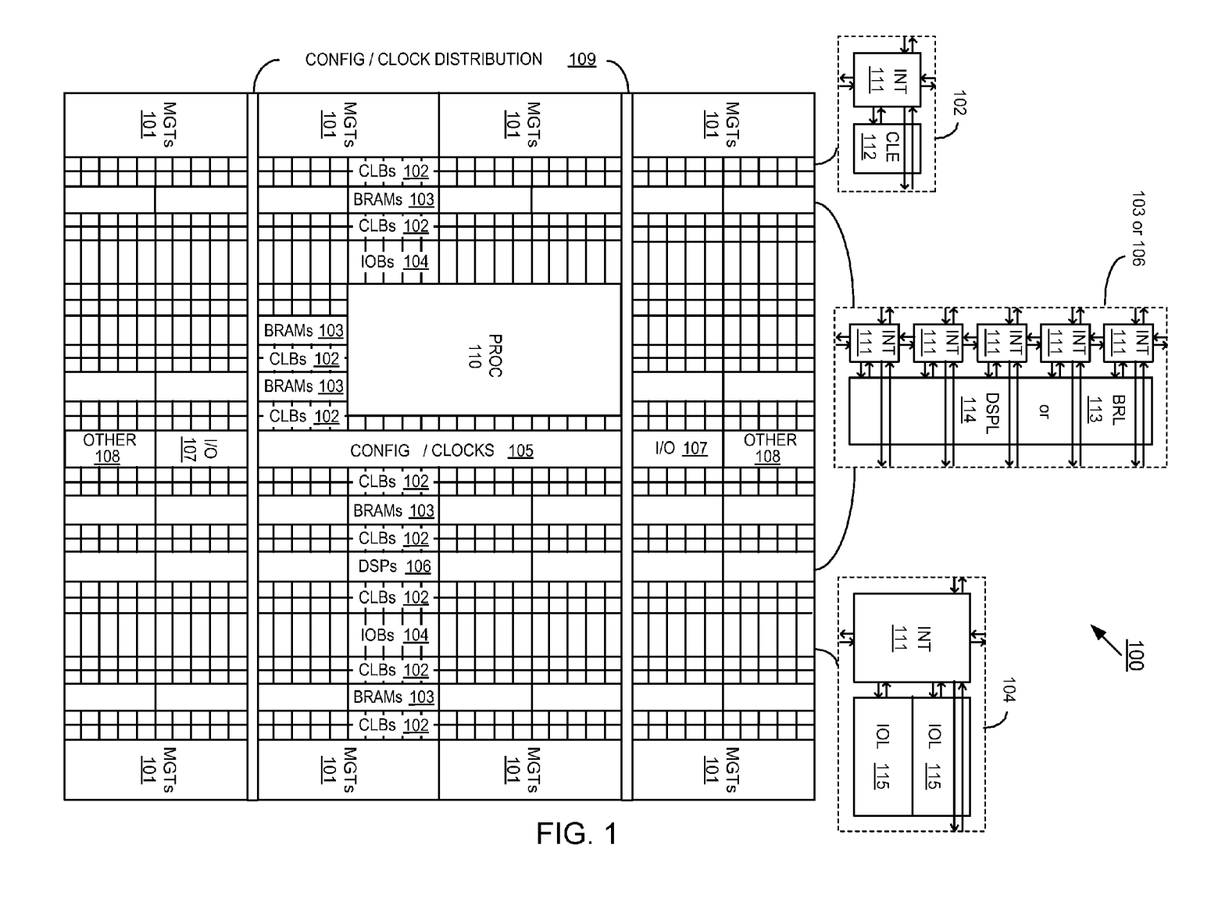
FIG. 1 is a first block diagram illustrating an architecture for an integrated circuit in accordance with an embodiment disclosed within this specification.

FIG. 1 is a first block diagram illustrating an architecture 100 for an integrated circuit (IC) in accordance with an embodiment disclosed within this specification. Architecture 100 can be implemented within a field programmable gate array (FPGA) type of IC, for example. As shown, architecture 100 includes several different types of programmable circuit, e.g., logic, blocks. For example, architecture 100 can include a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized I/O blocks 107 (e.g., configuration ports and clock ports), and other programmable logic 108 such as digital clock managers, analog-to-digital converters, system monitoring logic, and so forth.

In some ICs, each programmable tile includes a programmable interconnect element (INT) 111 having standardized connections to and from a corresponding INT 111 in each adjacent tile. Therefore, the INTs 111, taken together, implement the programmable interconnect structure for the illustrated IC. Each INT 111 also includes the connections to and from the programmable logic element within the same tile, as shown by the examples included at the top of FIG. 1.

For example, a CLB 102 can include a configurable logic element (CLE) 112 that can be programmed to implement user logic plus a single INT 111. A BRAM 103 can include a BRAM logic element (BRL) 113 in addition to one or more INTs 111. Typically, the number of INTs 111 included in a tile depends on the height of the tile. In the pictured embodiment, a BRAM tile has the same height as five CLBs, but other numbers (e.g., four) can also be used. A DSP tile 106 can include a DSP logic element (DSPL) 114 in addition to an appropriate number of INTs 111. An IOB 104 can include, for example, two instances of an I/O logic element (IOL) 115 in addition to one instance of an INT 111. As will be clear to those of skill in the art, the actual I/O pads connected, for example, to IOL 115 typically are not confined to the area of IOL 115.

In the example pictured in FIG. 1, a columnar area near the center of the die is used for configuration, clock, and other control logic. Horizontal areas 109 extending from this column are used to distribute the clocks and configuration signals across the breadth of the programmable IC.

Some ICs utilizing the architecture illustrated in FIG. 1 include additional logic blocks that disrupt the regular columnar structure making up a large part of the IC. The additional logic blocks can be programmable blocks and/or dedicated circuitry. For example, a processor block depicted as PROC 110 spans several columns of CLBs and BRAMs.

PROC 110 can be implemented as a hard-wired processor that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 can be considered part of the, or the, programmable circuitry of the IC.

FIG. 1 is intended to illustrate an exemplary architecture that can be used to implement an IC that includes programmable circuitry, e.g., a programmable fabric, and a processor system. For example, the number of logic blocks in a column, the relative width of the columns, the number and order of columns, the types of logic blocks included in the columns, the relative sizes of the logic blocks, and the interconnect/logic implementations included at the top of FIG. 1 are purely exemplary. In an actual IC, for example, more than one adjacent column of CLBs is typically included wherever the CLBs appear, to facilitate the efficient implementation of a user circuit design. The number of adjacent CLB columns, however, can vary with the overall size of the IC. Further, the size and/or positioning of PROC 110 within the IC is for purposes of illustration only and is not intended as a limitation of the one or more embodiments disclosed within this specification.

Figure 2:
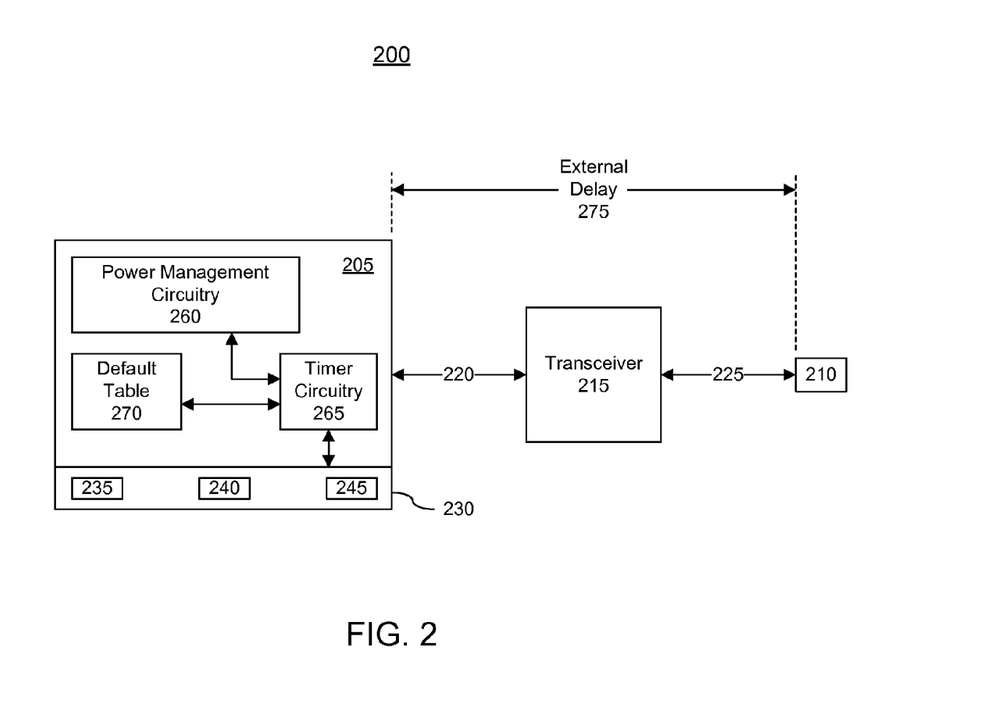
FIG. 2 is a second block diagram illustrating a system for implementing a low power state within a circuit in accordance with another embodiment disclosed within this specification.

FIG. 2 is a second block diagram illustrating a system 200 for implementing a low power state within a circuit in accordance with another embodiment disclosed within this specification. As shown, a circuit block 205 is coupled to one or more I/O pins (pins) 210. Circuit block 205 can be coupled to pins 210 through one or more intervening circuit blocks such as a transceiver 215 as illustrated in FIG. 2. Circuit block 205 is coupled to transceiver 215 via communication link 220. Transceiver 215 is coupled to pins 210 via communication link 225.

It should be appreciated that the particular number of intervening circuit blocks located in the signal path between circuit block 205 and pins 210, as shown in FIG. 2, is not intended to be limiting. For example, one or more additional circuit blocks can be located in the signal path between circuit block 205 and pins 210. Alternatively, circuit block 205 can be directly coupled to pins 210 with no intervening circuit blocks located between circuit block 205 and pins 210.

Within this specification, the same reference characters are used to refer to terminals, signal lines, wires, and their corresponding signals. In this regard, the terms "signal," "wire," "connection," "terminal," and "pin" may be used interchangeably, from time-to-time, within the this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

In this regard, communication link 220 and communication link 225 each can be configured to include one or more signals. For example, each of communication links 220 and 225 can include one or more unidirectional signals, one or more bidirectional signals, can be configured as a bus, or the like.

Circuit block 205 can be configurable to communicate at one or more different communication speeds, e.g., over communication link 220 and/or communication link 225. For example, during operation, circuit block 205 can communicate at a first communication speed, e.g., a first frequency or data rate. During operation, circuit block 205 can dynamically switch to communicate at a second and different communication speed. The first communication speed and the second communication speed can, but need not, be multiples of one another. Circuit block 205 can switch back and forth between communicating at the first communication speed and the second communication speed without experiencing an interruption in operation and without having to be powered off and back on.

In one or more embodiments, circuit block 205 can be implemented as a core, whether a soft core or a hard core, that can be available, or implemented, within an IC. For example, system 200, and thus, circuit block 205, can be implemented within an IC as described with reference to FIG. 1, e.g., a programmable IC. In another example, system 200, and thus, circuit block 205, can be implemented within an IC that is not programmable.

In one illustrative example, circuit block 205 can be implemented as a Peripheral Component Interconnect Express (PCIe) core. Modern implementations of PCIe cores that conform to standard specifications provide for a recommended timeout referred to herein as an "inactivity duration." The inactivity duration refers to the amount of time that must pass with no activity being detected on the communication link coupled to the PCIe core before a low power state can be implemented within the PCIe core. For example, the PCIe 2.0 Specification, as promulgated by the Peripheral Component Interconnect Special Interest Group (PCI-SIG) specifies a suggested inactivity duration of 7 microseconds. Thus, after determining that no activity has occurred on the communication link coupled to the PCIe core for 7 microseconds, the PCIe core can enter or initiate a low power state. No activity or inactivity can refer to the lack of data or the lack of signals on the communication link.

As noted, circuit block 205 can communicate at a first communication speed and at least a second communication speed. For example, the first communication speed can be 2.5 Gigabits per second (Gbps). The second communication speed can be 5 Gbps. As noted, circuit block 205 can switch back and forth between the first communication speed and the second communication speed to send and/or receive data over communication link 220 coupled thereto.

Circuit block 205 can include an interface 230, power management circuitry 260, timer circuitry 265, and a default table 270. Interface 230 can include one or more memories illustrated as memories 235, 240, and 245. In general, interface 230, via memories 235-245, determines the particular timer mode that is to be implemented by timer circuitry 265.

Timer circuitry 265, in general, can monitor communication channel 220 for activity, e.g., the conveyance of data. Accordingly, timer circuitry 265 can determine the amount of time for which no activity is detected upon communication link 220. Timer circuitry 265 further can determine when the time for which no activity is detected meets or exceeds an inactivity duration. The inactivity duration can be calculated or determined by the timer circuitry 265 based upon the selected timer mode.

By appropriately setting values within memories 235-245, interface 230 generally dictates the timer mode, and thus, the technique used to determine the inactivity duration. Timer circuitry 265 can calculate or determine the inactivity duration based upon a technique that is specified by the values loaded into memories 235-245 of interface 230. For example, a default timer mode, e.g., a first timer mode, for determining the inactivity duration can be specified. The default timer mode can be overridden by writing appropriate values to one or more of memories 235-245, thereby implementing one or more alternative timer modes, e.g., a second timer mode or a third timer mode.

Values stored within memories 235-245 of interface 230 can be set or stored in a variety of different ways. For example, consider the case in which the IC within which circuit block 205 is implemented is a programmable IC. In that case, values within memories 235-245 can be set by the loading of configuration data such as a configuration bitstream into the IC. The loading of configuration data can be performed to first instantiate, e.g., implement, physical circuitry such as circuit block 205 within the IC as well as establish values within memories 235-245. The loading of configuration data also can be performed in a dynamic manner, for example, in the case of dynamic configuration where new configuration data is loaded into the IC to implement new or different circuitry including circuit block 205 or to implement a version of circuit block 205 having a different configuration setting as specified in memories 235-245.

The loading of configuration data also can refer to dynamic partial reconfiguration where only a portion of the IC is reconfigured by the loading of a portion of a configuration bitstream. Dynamic partial reconfiguration allows some circuitry within the IC to remain intact and functional while other portions of the IC implement different physical circuitry based upon the partial configuration bitstream that is loaded into the IC. The newly implemented circuitry then can interact with the circuitry left intact within the IC without having to power cycle the IC.

In other examples, values can be loaded into memories 235-245 without having to reconfigure the IC. For example, values can be updated or changed by simply writing to one or more of memories 235-245 during operation of the IC including circuit block 205, e.g., without having to power cycle or discontinue operation of the IC. Values can be loaded into memories 235-245 during operation of circuit block 205 or responsive to resetting circuit block 205. Values can be written to memories 235-245 under the control of a software process that can execute within a processor of the IC that includes circuit block 205 or under the control of a software process that executes within a processor that is located outside of the IC.

In any case, memories 235-245 can store values that specify a particular timer mode that is to be implemented. For example, memory 235 can be configured to store a parameter referred to as a "timeout_enable" parameter. The timeout_enable parameter determines whether the default timer mode is to be used or overridden in favor of an alternative timer mode. For instance, the timeout_enable parameter can be a single bit parameter that can be set to a value, e.g., zero, indicating that the default timer mode is to be utilized. When the timeout_enable parameter is a value indicating that the default timer mode is to be utilized, the values stored in memories 240-245 become "don't care" values. The values stored in memories 240-245 become irrelevant as memories 240-245 store parameters relating to timer modes other than the default timer mode.

The inactivity duration used in the default timer mode can be specified by default table 270. Default table 270 can specify one or more inactivity durations that can be applied or used based upon one or more parameters of circuit block 205 and/or communication link 220. For example, given a particular parameter or set of parameters relating to circuit block 205 or communication link 220, e.g., width of communication link 220, speed of communication link 220 and/or circuit block 205, payload size of data on communication link 220, etc., a particular inactivity duration can be selected from default table 270. In an embodiment, the particular inactivity durations specified within default table 270 can be static in that the inactivity duration(s) are not dependent upon communication speed of circuit block 205. In the default mode, the inactivity duration can be selected by indexing into default table 270 using the one or more specified parameters. The inactivity duration can remain fixed or unchanged and is not dependent upon the communication speed of circuit block 205 which, as noted, can change dynamically.

When the timeout_enable parameter is set to a value, e.g., one, indicating that a timer mode other than the default timer mode is to be utilized, memories 240 and 245 are used to specify the particular timer mode to be implemented. Memory 240 can be configured to store a parameter referred to as a "timeout_function" parameter. In an embodiment, the timeout_function parameter can be a value, e.g., a single bit, that, in general, indicates whether the inactivity duration used by timer circuitry 265 is to be scaled according to the communication speed of circuit block 205 or, in the alternative, is to remain relatively constant despite the changing communication speed of circuit block 205. The alternative timer modes provide techniques for changing the inactivity duration in a flexible and dynamic manner that takes into account, for example, the current communication speed of circuit block 205 in view of the ability of circuit block 205 to dynamically switch between two or more different communication speeds. In one aspect, the flexibility is derived, at least in part, from the ability to utilize the current communication speed in effect at the time the inactivity duration is determined.

When the timeout_function parameter is a value, e.g., zero, the timer mode that is selected can be referred to as scaled timer mode. Scaled timer mode effectively generates an inactivity duration used by timer circuitry 265 that scales according to a current communication speed of circuit block 205. In scaled timer mode, memory 245 can be used to store a value that specifies a timeout value. The timeout value can be scaled according to the current communication speed of circuit block 205 to determine the inactivity duration that is used. Scaled timer mode attempts to provide an inactivity duration that changes according to the current communication speed. In general, the faster the current communication speed of circuit block 205, the shorter the inactivity duration.

When the timeout_function parameter is a value, e.g., one, the timer mode that is selected can be referred to as delay timer mode. Delay timer mode effectively generates an inactivity duration that remains substantially constant despite changing communication speeds of circuit block 205. Delay timer mode adjusts a baseline inactivity duration according to a measure of an external delay 275. External delay 275 can be a value that indicates the one-way delay for propagating data, e.g., a symbol, from circuit block 205 to pins 210 or, in the alternative, from pins 210 to circuit block 205.

As noted, the signal path illustrated in FIG. 2 is provided for purposes of illustration. As such, the signal path can be a direct connection between an input port and/or an output port of circuit block 205 to pins 210 or can have one or more intervening circuit blocks such as transceiver 215. Pins 210 can represent nodes of the particular IC that includes circuit block 205 and transceiver 215 that couple to a system and/or circuit elements external to the IC.

In delay timer mode, external delay 275 can be stored within memory 245. External delay 275 can be scaled according to the current communication speed of circuit block 205.

For example, the scaled external delay can be subtracted from the baseline inactivity duration to determine the inactivity duration that is used within timer circuitry 265. In this manner, delay timer mode attempts to calculate a substantially constant time of inactivity prior to implementing the low power state. The time period does not vary, or does not vary substantially, with changes in communication speed of circuit block 205, particularly when considering the propagation delay of the signal path between circuit block 205 and pins 210 in combination with the inactivity duration used for timer circuitry 265. When circuit block 205 operates at a higher communication speed, the propagation delay for data exchanged between pins 210 and circuit block 205 is shorter than when circuit block 205 operates at a slower communication speed. In general, delay timer mode attempts to account for changing external delay 275 based upon the current communication speed of circuit block 205.

For example, a recommended timeout, which can be stored as the baseline inactivity duration, typically is specified with respect to the external pins of the IC such as pins 210. Timer circuitry 265, however, is located within the IC, e.g., within circuit block 205. Delay timer mode reduces the baseline inactivity duration by the scaled external delay. Thus, at faster communication speeds, delay timer mode generates an inactivity duration that is longer than when circuit block 205 communicates at a slower communication speed to account for the changing propagation delay of data between circuit block 205 and pins 210.

As discussed, the interpretation of the value stored within memory 245 depends upon the particular timer mode that is implemented as specified by the timeout_function parameter. When in scaled timer mode, the value stored within memory 245 is interpreted as a timeout value. When in delay mode, the value stored in memory 245 is interpreted as external delay 275. In either case, the value stored in memory 245 can be scaled. For example, the value can be scaled according to, e.g., in a manner that depends upon, the current communication speed of circuit block 205.

In one or more embodiments, timer circuitry 265 can scale the value stored within memory 245 according to "symbol" time. In one aspect, symbol time can be defined as the amount of time needed to transmit a predetermined number of bits of encoded data, e.g., a symbol. For example, the period of time required to place a symbol on a lane can be 10 times the Unit Interval when using 8b/10b encoding. The period of time required to place a symbol on a lane can be 8 times the Unit Interval when using 128b/130b encoding.

In determining or calculating symbol time, it should be appreciated that different types of encoding vary the number of bits that are transmitted. For instance, 8 bits of data becomes 10 bits of data after encoding when transmitting at either 2.5 Gbps or 5 Gbps since 8b10b encoding is used. Correspondingly, 8 bits of data remains 8 bits of data when operating at a speed such as 8 Gbps since 8b10 encoding is not utilized. Symbol time generally translates into 4 nanoseconds for 2.5 Gbps operation and 2 nanoseconds for 5 Gbps operation. At 8 Gbps, the symbol time is 1 nanosecond.

Accordingly, the value stored in memory 245 can be scaled according to the symbol time for the current communication speed. For purposes of illustration, when circuit block 205 has a communication speed of approximately 5 Gbps, the symbol time is approximately 2 nanoseconds. When circuit block 205 has a communication speed of approximately 2.5 Gbps, the symbol time is approximately 4 nanoseconds. As illustrated, symbol time can depend upon the communication speed and the type of encoding used, if at all.

It should be appreciated that the particular symbol time, in reference to the amount of time required to transmit one symbol, depends upon the communication speed of circuit block 205. The particular values provided within this specification are intended to be examples and, as such, are not intended to be limiting of the one or more embodiments disclosed herein. Further, it should be appreciated that the communication speed of circuit block 205 also can be considered the communication speed, or link speed, of communication link 220.

In operation, timer circuitry 265 can be configured to access interface 230 to read memories 235-245. Timer circuitry 265, responsive to reading one or more of memories 235-245 can implement a selected timer mode, e.g., the default timer mode, the scaled timer mode, or the delay timer mode. When implementing the default timer mode, the inactivity duration used by timer circuitry 265 is obtained or read from default table 270. When implementing the scaled timer mode or the delay timer mode, timer circuitry can determine the inactivity duration based upon values read from memories 240 and 245 as described within this specification.

Once the inactivity duration is set within timer circuitry 265, timer circuitry 265 can monitor communication link 220 for activity or inactivity as the case may be. Timer circuitry 265 can determine when the amount of time that communication link 220 is inactive, e.g., carries no traffic or data, meets or exceeds the inactivity duration. Responsive to determining that communication link 220 has been inactive for an amount of time equal to or exceeding the inactivity duration, timer circuitry 265 can signal power management circuitry 260 to initiate the low power state within circuit block 205. Alternatively, power management circuitry 260 can monitor timer circuitry 265 for an indication that communication link 220 has been inactive for the inactivity duration.

It should be appreciated that while timer circuitry 265 is described as including signal monitoring circuitry, the signal monitoring circuitry can be external to, and independent of, timer circuitry 265. The signal monitoring circuitry can indicate the lack of signal or data on communication link 220 and/or the presence of signal or data on communication link 220 in order to initiate timer functions within timer circuitry 265. For example, timer circuitry 265 can communicate with the signal monitoring circuitry to begin timer functions responsive to an indication from the signal monitoring circuitry that communication link 220 is or has become inactive.

It should be appreciated that while interface 230 is illustrated as being incorporated within, or part of, circuit block 205, in another embodiment, interface 230 can be separate from and/or independent of circuit block 205. For example, interface 230 can be located on a different portion of the IC that includes circuit block 205. Circuit block 205 and, in particular, timer circuitry 265, can be configured to read values from memories 235, 240, and/or 245 of interface 230 whether interface 230 is implemented as part of circuit block 205 or separate from circuit block 205.

Similarly, it should be appreciated that while timer circuitry 265 is illustrated as being incorporated within, or part of, circuit block 205, in another embodiment, timer circuitry 265 can be separate from and/or independent of circuit block 205. For example, timer circuitry 265 can be located on a different portion of the IC that includes circuit block 205 and can be configured to begin counting the passage of time responsive to a signal from the signal monitoring circuitry that monitors communication link 220. Timer circuitry 265 can be configured to provide a signal to circuit block 205, for example, responsive to determining that an amount of time equal to or exceeding the inactivity duration has elapsed.

Figure 3:
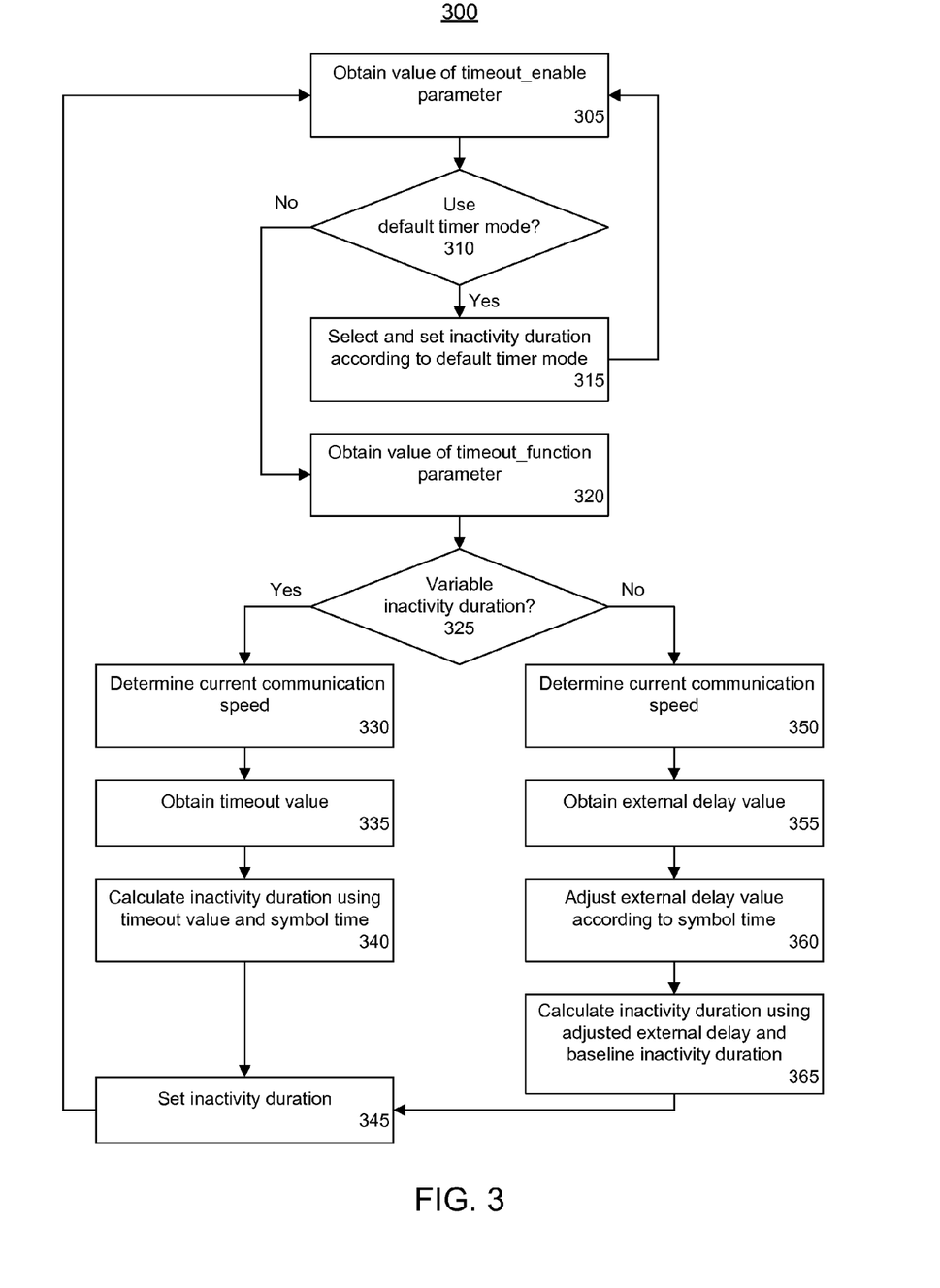
FIG. 3 is a flow chart illustrating a method of timing implementation of a low power state within a circuit in accordance with another embodiment disclosed within this specification.

FIG. 3 is a flow chart illustrating a method 300 of timing implementation of a low power state within a circuit in accordance with another embodiment disclosed within this specification. Method 300 can be implemented by a circuit or system, for example, as described with reference to FIG. 2. Method 300 can begin in a state where, at least initially, values have been stored within the memories of the interface as described. Circuitry such as the circuit block that is to implement the low power state and/or the timer circuitry can be configured to perform the various functions described within method 300.

In step 305, the timer circuitry can obtain the value of the timeout_enable parameter from a memory of the interface. In step 310, the timer circuitry can determine whether to use the default timer mode or another mode based upon the value obtained or read for the timeout_enable parameter. Responsive to determining that the value of the timeout_enable parameter indicates that the default timer mode is to be used, method 300 can proceed to step 315.

In step 315, the timer circuitry selects the default timer mode and sets the inactivity duration according to the default timer mode. As noted, the default timer mode sets the inactivity duration using the default table, e.g., by indexing into the default table based upon one or more configuration parameters of the circuit block and/or communication link coupled to the circuit block. After step 315, method 300 can loop back to step 305 to continue operation.

Responsive to determining that the value of the timeout_enable parameter indicates that the default timer mode is not to be used, method 300 can proceed to step 320. In step 320, the timer circuitry can obtain or read a value of the timeout_function parameter. In step 325, the timer circuitry can determine whether the inactivity duration is to be variable. More particularly, the timer circuitry determines whether to implement the scaled timer mode or the delay timer mode based upon the value read for the timeout_function parameter. The scaled timer mode effectively implements a variable inactivity duration. The delay timer mode effectively implements a relatively constant inactivity duration as described within this specification. It should be appreciated, however, that both the delay timer mode and the scaled timer mode are dependent upon the communication speed of the circuit block in effect at the time the inactivity duration is calculated, e.g., the current communication speed.

Responsive to determining that the inactivity duration is to be variable, method 300 can proceed to step 330 to begin determining the inactivity duration according to the scaled timer mode. In step 330, the timer circuitry can determine the current communication speed of the circuit block. In an embodiment, the current communication speed can be stored as an attribute in a memory, whether in a random access memory, a read-only memory, a register, a data table, or the like.

In step 335, the timer circuitry can determine the timeout value from the memory of the interface. The timeout value can be a user specified value that is stored within the memory of the interface using any of the multiple different mechanisms already discussed within this specification for loading values within the memories of the interface.

In step 340, the timer circuitry can calculate the inactivity duration using the timeout value and the symbol time. In an embodiment, the timeout value can be multiplied by the symbol time. Generally, the symbol time is dependent upon the current communication speed. As noted, for a communication speed of 5 Gbps, the symbol time can be approximately 2 nanoseconds. For a communication speed of 2.5 Gbps, the symbol time can be approximately 4 nanoseconds. Accordingly, for a given timeout value, the timeout value is multiplied by the symbol time corresponding to the current communication speed. The result of the multiplication operation is the inactivity duration used for the scaled timer mode.

The scaled timer mode results in the determination of an inactivity duration that scales with the current communication speed. When the current communication speed of the circuit block, for example, is at full speed as opposed to half speed, the inactivity duration is approximately one-half of the duration of the inactivity duration when the circuit block is operating at half-speed.

After step 340, the method can continue to step 345 where the timer circuitry sets the inactivity duration to the value determined in step 340. After step 345, the method can loop back to step 305 to begin the process anew. It should be appreciated that with each iteration through method 300, the timer circuitry can implement the particular timer mode specified within memories of the interface based upon the values written therein, which can be updated as described within this specification.

Turning again to step 325, responsive to determining that the inactivity duration is not to be variable, method 300 can proceed to step 350 to begin determining the inactivity duration according to the delay timer mode. In step 350, the timer circuitry can determine the current communication speed of the circuit block. In step 355, the timer circuitry can determine the external delay value from the memory of the interface. The external delay value can be a user specified value that is stored within the memory of the interface using any of the multiple different mechanisms already discussed within this specification.

In step 360, the timer circuitry can adjust the external delay value according to the symbol time. In an embodiment, the external delay value can be multiplied by the symbol time to derive an adjusted external delay value. As discussed, the symbol time is dependent upon the current communication speed. Accordingly, for a given external delay value, the external delay value is multiplied by the symbol time corresponding to the current communication speed.

In step 365, the timer circuitry can calculate the inactivity duration using the adjusted external delay value and the baseline inactivity duration. In an embodiment, the baseline inactivity duration can be a value that is set within the timer circuitry by default. For example, the baseline inactivity duration can be set to a value of, or approximately of, 7 microseconds, e.g., a value corresponding to the timeout period suggested and/or mandated by a controlling specification. In an embodiment, the adjusted external delay value can be subtracted from the baseline inactivity duration. The result of the subtraction can be used as the inactivity duration for the delay timer mode.

The delay timer mode results in the determination of an inactivity duration that remains substantially at the baseline inactivity duration when viewed in absolute terms to include the signal path delay incurred from external pins to the circuit block including the timing circuitry. The inactivity duration is calculated in a manner that accommodates for the external delay of the communication links or signal path using, at least in part, the current communication speed. Adjusting the baseline inactivity duration according to the external delay in a manner that accounts for communication speed allows the user to utilize the maximum recommended timeout while accounting for any delay in the signal path.

For example, a recommended timeout, which can be stored as the baseline inactivity duration, typically is specified with respect to the external pins of the IC. When the timer circuitry is located within the IC, e.g., within the circuit block to implement the low power state, the recommended timeout can be adjusted, e.g., lowered, by the time needed for data to travel from the external pins to the circuit block.

After step 365, the method can continue to step 345 where the timer circuitry sets the inactivity duration to the value determined in step 365. After step 345, the method can loop back to step 305 to begin the process anew. By iterating through method 300 as described, the particular timer mode can be modified based upon values stored within the interface as well as the particular communication speed that is in effect, e.g., the current communication speed, at the time the inactivity duration is to be determined or calculated.

As noted, once the inactivity duration is set within the timer circuitry, the signal monitoring circuitry can initiate the timer functionality, e.g., trigger the timer circuitry to begin counting down, or up as the case may be, responsive to detecting inactivity on the communication link coupled to the circuit block. When the inactivity duration expires, the timer circuitry can notify the power management circuitry to initiate the low power state within the circuit block. It should be appreciated that the timer circuitry can be reset by the signal monitoring circuitry prior to expiration of the inactivity duration responsive to detecting activity on the communication link. The particular inactivity duration calculated and used to reset the timer circuitry can be determined as discussed within this specification.

The one or more embodiments disclosed within this specification provide mechanisms and techniques relating to determining when to implement a low power state within a circuit block. The one or more embodiments, however, can be applied to other circuits and/or systems where propagation delays are to be accounted for within an environment where the communication speed between the endpoints of a signal path can vary between two or more different frequencies or data rates.

The flowcharts in the figures illustrate the architecture, functionality, and operation of possible implementations of systems and methods according to one or more embodiments disclosed within this specification. It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

One or more embodiments can be realized in hardware or a combination of hardware and software. One or more embodiments can be realized in a centralized fashion in one system or in a distributed fashion where different elements are spread across several interconnected systems. Any kind of circuitry or other apparatus adapted for carrying out at least a portion of the methods described herein is suited.

One or more embodiments further can be embedded in a device such as a computer program product, which comprises all the features enabling the implementation of the methods described herein. The device can include a data storage medium, e.g., a non-transitory computer-usable or computer-readable medium, storing program code that, when loaded and executed in a system comprising memory and a processor, causes the system to perform at least a portion of the functions described within this specification. In another aspect, the device can include a data storage medium, storing program code that, when loaded within a programmable IC, implements or instantiates the circuitry described herein within the programmable IC. Examples of data storage media can include, but are not limited to, optical media, magnetic media, magneto-optical media, read-only memory, computer memory such as random access memory, a bulk storage device, e.g., hard disk, or the like.

The terms "computer program," "software," "application," "computer-usable program code," "program code," "executable code," variants and/or combinations thereof, in the present context, mean any expression, in any language, code or notation, of a set of instructions intended to cause a system having an information processing capability to perform a particular function either directly or after either or both of the following: a) conversion to another language, code, or notation; b) reproduction in a different material form. For example, program code can include, but is not limited to, a subroutine, a function, a procedure, an object method, an object implementation, an executable application, an applet, a servlet, a source code, configuration data, a configuration bitstream, a programmatic description of circuitry, e.g., hardware description language or a netlist, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

One or more embodiments disclosed within this specification can be embodied in other forms without departing from the spirit or essential attributes thereof. Accordingly, reference should be made to the following claims, rather than to the foregoing specification, as indicating the scope of the one or more embodiments.

What is claimed is:

1. A method of timing implementation of a low power state within a circuit configurable to communicate at one of a plurality of different communication speeds, the method comprising:
    determining a current communication speed of the circuit; and
    determining an inactivity duration of the circuit according to the current communication speed of the circuit,
    wherein determining the inactivity duration comprises:
    setting the inactivity duration according to a measure of delay external to the circuit,
    wherein the measure of delay external to the circuit is determined, according to the current communication speed,
    wherein responsive to detecting inactivity for an amount of time corresponding to the inactivity duration, the low power state is implemented within the circuit.

2. The method of claim 1, wherein determining the inactivity duration comprises:
    scaling a timeout value according to the current communication speed.

3. The method of claim 1, further comprising:
    switching between a first timer mode and a second timer mode according to a timer parameter,
    wherein the first timer mode comprises varying the inactivity duration according to the current communication speed, wherein the second timer mode comprises adjusting a baseline inactivity duration according to a measure of delay external to the circuit, and wherein the measure of delay external to the circuit is adjusted according to the current communication speed.

4. A method of timing implementation of a low power state within a circuit, the method comprising:
- selectively overriding a first timer mode according to a first parameter value,
- wherein each timer mode specifies a method of calculating an inactivity duration,
- wherein responsive to detecting inactivity for an amount of time corresponding to the inactivity duration, the low power state is implemented;
- responsive to determining that the first parameter value does not indicate override, implementing the first timer mode; and
- responsive to determining that the first parameter value indicates override, implementing a different timer mode;
- wherein the circuit is configurable to dynamically switch between communicating at a plurality of different communication speeds, wherein implementing a different timer mode comprises:
- determining a current communication speed of the circuit; and
- determining the inactivity duration according to the current communication speed of the circuit.

5. The method of claim 4, wherein determining the inactivity duration according to the current communication speed of the circuit comprises:
- adjusting a timeout value according to a symbol time that is dependent upon the current communication speed of the circuit.

6. The method of claim 4, wherein the circuit is configurable to dynamically switch between communicating at a plurality of different communication speeds, wherein implementing a different timer mode further comprises:
- determining whether to implement a variable inactivity duration;
- determining a current communication speed of the circuit; and
- responsive to determining that the inactivity duration is to be variable, setting the inactivity duration according to the current communication speed of the circuit.

7. The method of claim 6, further comprising:
- responsive to determining that the inactivity duration is not to be variable, setting the inactivity duration according to a measure of delay external to the circuit that is scaled according to the current communication speed of the circuit.

8. A method of timing implementation of a low power state within a circuit, the method comprising:
- selectively overriding a first timer mode according to a first parameter value,
- wherein each timer mode specifies a method of calculating an inactivity duration,
- wherein responsive to detecting inactivity for an amount of time corresponding to the inactivity duration, the low power state is implemented;
- responsive to determining that the first parameter value does not indicate override, implementing the first timer mode; and
- responsive to determining that the first parameter value indicates override, implementing a different timer mode wherein implementing a different timer mode comprises:
- determining the inactivity duration according to a measure of delay external to the circuit,
- wherein determining the inactivity duration further comprises:
- adjusting the measure of delay external to the circuit according to a symbol time that is dependent upon the current communication speed of the circuit.

9. The method of claim 8, wherein adjusting the measure of delay external to the circuit further comprises:
- subtracting the measure of external delay adjusted according to the symbol time from a baseline inactivity duration.

10. A system configurable to dynamically switch between communicating at a plurality of different communication speeds, the system comprising:
- a power management circuit configured to initiate a low power state within the system responsive to detecting inactivity for an amount of time corresponding to an inactivity duration; and
- a timer circuit configured to determine the inactivity duration according to one of a plurality of timer modes,
- wherein the plurality of timer modes comprise:
  - a first timer mode specifying a default value for the inactivity duration; and
  - a second timer mode selectable to override the first timer mode, wherein the second timer mode is operable to determine the inactivity duration according to a current communication speed of the system; and
- wherein the timer circuit is further configured to implement the second timer mode by adjusting a baseline inactivity duration value according to a measure of delay external to the system.

11. The system of claim 10, wherein the timer circuit is further configured to adjust the baseline inactivity duration by:
- scaling the measure of delay external to the system according to the current communication speed of the system.

12. The system of claim 11, wherein scaling the measure of delay external to the system according to the current communication speed further comprises:
- scaling the measure of delay by a symbol time that is dependent upon the current communication speed of the system.

13. The system of claim 12, wherein adjusting the baseline inactivity duration value according to a measure of delay external to the system comprises:
- subtracting the measure of external delay scaled according to symbol time from the baseline inactivity duration.

14. The system of claim 10, wherein the timer circuit implements the second timer mode by:
- determining whether the inactivity duration is to be variable;
- responsive to determining that the inactivity duration is to be variable, determining the inactivity duration by scaling a timeout value according to the current communication speed of the system; and
- responsive to determining that the inactivity duration is not to be variable, adjusting a baseline inactivity duration according to a measure of delay external to the system that is scaled according to the current communication speed of the system.

* * * * *